United States Patent [19]

Bennett et al.

[11] 4,256,556

[45] Mar. 17, 1981

[54] ANODICALLY POLARIZED SURFACE FOR BIOFOULING AND SCALE CONTROL

[75] Inventors: John E. Bennett; Joseph E. Elliott, both of Painesville, Ohio

[73] Assignee: Diamond Shamrock Corporation, Dallas, Tex.

[21] Appl. No.: 963,611

[22] Filed: Nov. 24, 1978

[51] Int. Cl.³ .............................................. C23F 13/00
[52] U.S. Cl. ..................................................... 204/147
[58] Field of Search ............... 204/147, 148, 196, 197, 204/129

[56] References Cited

U.S. PATENT DOCUMENTS

| | | | |
|---|---|---|---|
| 3,102,086 | 8/1963 | Cotton | 204/148 |
| 3,412,000 | 11/1968 | Bedi | 204/147 |
| 3,442,779 | 5/1969 | Hoey | 204/196 |
| 3,632,498 | 1/1972 | Beer | 204/290 F |
| 3,751,296 | 8/1973 | Beer | 204/290 F |
| 3,798,142 | 3/1974 | Evans | 204/196 |
| 3,846,273 | 11/1974 | Bianchi et al. | 204/196 |
| 4,005,003 | 1/1977 | Popplewell et al. | 204/290 F |
| 4,056,142 | 11/1977 | Baumann | 204/196 |
| 4,108,745 | 8/1978 | Cipris et al. | 204/129 |
| 4,196,064 | 4/1980 | Harms et al. | 204/147 |

OTHER PUBLICATIONS

Mantell, "Electrochemical Engineering", 4th ed., 1960, pp. 53-59, 248-254.

*Primary Examiner*—G. L. Kaplan
*Attorney, Agent, or Firm*—John P. Hazzard

[57] ABSTRACT

Biofouling and scale control in conductive aqueous systems is effected on metal, preferably valve metal such as titanium, surfaces on which such fouling normally occurs by applying thereto a stable electrocatalytic coating, anodically polarizing said valve metal coating such that only oxygen is evolved at the surface thereof, preferably at a rate at least about 4.66 millimoles per square meter per hour without evolution of any chlorine.

9 Claims, No Drawings

ANODICALLY POLARIZED SURFACE FOR BIOFOULING AND SCALE CONTROL

BACKGROUND OF THE INVENTION

Maintaining metallic surfaces clear and free of deposits has long been a universal problem. Metallic surfaces made from valve metal or the so-called "film forming" metals such as titanium, tantalum, zirconium, aluminum, niobium and tungsten are, under most circumstances, quite immune to normal corrosion and thus such materials are widely used as heat exchange surfaces. However, such surfaces as well as other electroconductive surfaces such as other metals or graphite are vulnerable to biofouling as well as scale which deposits interfere with the heat transfer, impede fluid control, corrode the exchanger surface, and the like. Such deposits may be of the alkaline type, such as metal carbonates, or marine growth, such as barnacles, algae and the like. All such deposits, whether they are in a soft, semi-soft, or hardened condition, must be removed for efficient heat exchange operations. Thus, once the deposits become a problem, the equipment must be shut down and operations terminated until such deposits are removed from the heat exchange surfaces. Various means of removing deposits from metallic surfaces have been employed in the past. Most prominent and still prominent today is the shutting down of such fouled equipment and either mechanically scraping the deposits therefrom or acid washing the equipment to remove such deposits. Both of these treatments require significant loss of time on-line owing to the necessary shutdown of the equipment. Where the deposits are the result of calcium and/or magnesium scale formation, water softeners and conditioners may be used to reduce the formation of scale. However, such means are quite expensive and are often incapable of completely preventing the formation of such scale deposits.

Another method of keeping the surfaces of heat exchangers clear is by continuously subjecting said surface to chlorine or sodium hypochlorite generated in situ. Such treatment will prevent the growth of algae and barnacle formation. Normally, the chlorine is added to the system although it can be manufactured in situ if the liquid used in the system is capable of passing a current and contains salt or other chlorine producer. Typical of such systems is that described in U.S. Pat. No. 3,241,512 which electrolytically prevents fouling of ship surfaces by the electrolysis of salt water to produce chlorine gas which is distributed over the boat hull keeping the surface thereof clean while removing and/or preventing barnacles, algae and other foreign and undesirable material. In this patent, copper electrodes are used which also provide dissolved copper ions which likewise assist in preventing fouling. Other prior art describe similar processes wherein dimensionally stable anodes are used for producing the chlorine in situ to prevent fouling.

BRIEF SUMMARY OF THE INVENTION

The essence of the instant invention is the electrolysis of water at the appropriate voltages and current to produce the requisite amount of oxygen and hydrogen ions per unit time to prevent deposit formation on the surface of the metal, said voltages being insufficient to electrolyze any salt present in the electrolyte and thereby avoid formation of chlorine gas. The hydrogen ion produced by the electrolysis along with possibly nascent oxygen continuously effect a skin layer of electrolyte which is highly acid and is effective in preventing deposition of hardness scale as well as biofouling. When the metallic surface to be protected is a valve metal, such as titanium, it is coated with a stable catalytic coating which is capable, at extremely low current flows and voltages, of producing an effective quantity of oxygen and hydrogen ion to prevent hardness scale and/or biofouling.

DETAILED DESCRIPTION OF THE INVENTION

The instant invention prevents both biological growth and hardness scale on metallic surfaces without the generation of toxic chemicals such as chlorine gas which can damage life forms in the ocean environment while at the same time avoiding dissolution of toxic metallic ions to the aqueous environment. The invention, therefore, has its greatest utility in processes where seawater is utilized in large quantities and returned to the ocean, although the present invention can also be utilized in non-saline situations such as multi-effect evaporators where hardness scale is of prime consideration. For ease of description, however, the instant invention will be described with respect to its application in a seawater environment, although seawater is not a necessity in the broadest sense in the instant invention.

The essence of the instant invention is to prevent marine growth or hardness scale on a metallic surface. This is accomplished by making said surface anodic so as to electrolyze the water in the electrolyte so as to evolve sufficient oxygen and hydrogen ion to prevent marine growth as well as hardness scale caused by calcium and magnesium compounds found as impurities in the electrolyte. The anodic electrochemical reaction under these circumstances is as follows:

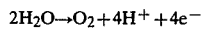

$$2H_2O \rightarrow O_2 + 4H^+ + 4e^-$$

From this reaction one can see that four moles of hydrogen ion are generated for every mole of oxygen which is evolved. This hydrogen ion evolution creates a very low pH layer in the electrolyte immediately adjacent the surface of the metal anode. This acidic layer is believed to be responsible for the prevention buildup on said anodic surface, while it is impossible to measure the actual pH of this region of high acidity, since it is extremely thin. However, indirect voltage measurements imply that it is in the pH range of approximately 1-3. It might also be possible that some active intermediate such as nascent oxygen might be in part responsible for inhibiting marine growth. No mater what the exact mechanism is, however, numerous tests have borne out the fact that biofouling and hardness scale can be prevented at low current and voltage levels merely by the evolution of oxygen and hydrogen ion from water electrolysis without the need of chlorine generation. The ratio of oxygen and hydrogen ion produced by the water electrolysis is fixed by the above equation, but the amount required in order to be effective can vary broadly depending on a number of variables associated with the particular system to be protected from hardness scale and/or biofouling. Such variables include salinity of the electrolyte, hardness content of the electrolyte, temperature of the electrolyte, flow rate of the electrolyte, bioactivity of the electrolyte, and geometry of the system.

To keep a surface clean without the generation of toxic chemicals, the surface must be maintained at a voltage less anodic than that which generates chlorine in the particular system involved. For seawater, this voltage is 1.375 volts vs. NHE (1.33 volts vs. SCE). For less saline solutions, i.e., solutions containing less chloride ion, this threshold voltage at which chlorine would be produced would be somewhat higher. Thus, in the practice of the present invention, the voltage level must be at or below the threshold voltage for the electrolyte where chlorine first would be evolved. In addition, sufficient oxygen must be generated at the voltage below the threshold voltage for chlorine production to effectively prevent biological growth and/or hardness scale. The amount of oxygen evolution under given voltage conditions will, of course, depend on the current flowing and the ability of the anodic metal surface to catalyze oxygen evolution. While lesser amounts of oxygen evolution will be effective in controlling hardness scale and biofouling under the less stringent conditions, the preferred rate of oxygen evolution is about at least 4.66 millimoles $O_2$ per square meter hour for adequate protection over widely varying conditions. Most preferably, 10.0 millimoles $O_2$ or more per square meter hour are evolved in the more stringent conditions.

Not all metallic surfaces will be effective in the practice of the instant invention since many will begin to generate chlorine before sufficient oxygen generation can be effected. Thus, in order to successfully practice the instant invention of equipment having such metallic surfaces, a stable electrocatalytic coating must be applied to the anode which will catalyze sufficient oxygen evolution at the selected voltage below the threshold voltage for the system for chlorine evolution.

The stable electrocatalytic coating may be one of metals, alloys, metal oxides or mixtures thereof. In the case of metal coatings, ruthenium and iridium are the preferred coatings. Metal coatings of platinum and palladium are inoperative in the practice of the instant invention since chlorine is generated at least before sufficient quantities per unit time of oxygen are generated. Coatings of rhenium metal or alloys of rhenium and palladium are marginal in the practice of the instant invention. While they are operable, the control of voltage and current must be extremely accurate in order to produce sufficient oxygen per unit time without evolution of chlorine.

Among the metal oxide coatings useful in the present invention are the so-called Beer coatings such as described in U.S. Pat. No. 3,632,498. These Beer coatings consist of a flim-forming oxide and a platinum group oxide. Among the preferred coatings of the Beer type is one which utilizes a mixture of titanium dioxide and ruthenium dioxide.

Other stable anodic coatings useful in the present invention are those described in Beer U.S. Pat. No. 3,751,296, U.S. Pat. No. 3,853,739, U.S. Pat. No. 3,855,092, and U.S. Pat. No. 4,005,003. These cited patents not only describe coatings which are nonpassivating and electrocatalytic for oxygen production in saltwater environments, but they also disclose the various mehods for applying the catalytic coating to a metallic surface which in the present case preferably is a film-forming metal, most preferably titanium. In any event, although a wide variety of catalytic coatings can be used in the present invention, it is still absolutely necessary to pick a catalytic coating which is operable at a voltage below the voltage at which chlorine is first evolved in the system and at the same time be capable of producing sufficient oxygen, preferably about 4.66 millimoles of oxygen or more, per square meter hour of electrocatalytic coated surface area.

As stated earlier, the electrocatalytic dimensionally stable coating may be applied in the various manners described in the cited patents as well as those methods obvious to those skilled in the art. However, a particularly preferred method of applying the coatings useful in the present invention is to merely apply a coating solution to the tubes of the heat exchange surface, whether it be interior or exterior surface, followed by resistance heating to the appropriate temperature using AC current. In this case, the valve metal tube is its own resistance heater and generates sufficient heat on the application of alternating current to oxidize the coating solution applied to the surface of the valve metal tube. When coating tube bundles or other more difficult shapes, it should be borne in mind that areas near welds are more difficult to apply a proper coating. In tube bundles where the welds appear at the entrance and exit of the bundle this problem is most critical since biological fouling is often worse at the entry and exit of such tubes. In such cases we prefer to assure that these areas contain a proper coating and, therefore, prefer to apply a second or precautionary coating in such areas and simply flame brush said areas to oxidize the coating material.

Another coating useful in the practice of the instant invention is that described in pending U.S. application Ser. No. 890,374, filed Mar. 27, 1978, now U.S. Pat. No. 4,180,445, by the instant inventors. This application describes an oxygen selective anodic coating which consists of delta manganese dioxide. The delta form of manganese dioxide is highly oxygen selective and, in fact, works opposite to other forms of manganese dioxide which tend to generate chlorine in a seawater electrolysis situation rather than oxygen. The delta manganese dioxide can be applied to the surface by placing the surface to be coated in an acidic saline solution to which sufficient quantities of manganous ions have been added and electrolyzing said saline solution so that the amorphous or low crystallinity coating of manganese dioxide is generated on the anodic substrate to be coated. Initially chlorine will be generated but, when the surface is sufficiently coated with delta manganese dioxide, the chlorine evolution is fully replaced with oxygen evolution.

The prime utility of the instant invention appears to be in maintaining heat exchange surfaces clear and free of biological and hardness deposits so as to maximize and/or maintain highly efficient heat exchange characteristics. The anodic stable coatings applied to the heat exchange surfaces by the practice of the instant invention are extremely thin and in no way interfere with the heat exchange properties of the system except that they maintain high heat exchange efficiency by preventing the buildup of biological or hardness deposits on the heat exchange surface. While the practice of the instant invention is not detrimental to heat exchange properties, it has been observed on a number of occasions that the practice of the instant invention, in fact, improves (about 10%) the heat exchange properties of a given system perhaps due to the fact that the film effect of the liquid flowing through the heat exchanger is disrupted by the oxygen evolution on the anodic surface leading to better heat transfer characteristics.

In many applications, it is not required to maintain the surface to be protected from biological fouling and/or hardness deposits by maintaining it continuously anodic. In such cases, the surface to be protected must be anodic only for a portion of any time period depending on the facts of the particular heat exchange system, the degree of contamination of the cooling medium, and the like. In such instances, one would merely interrupt the anodic polarity over varying time spans as, for example, making such surface anodic every eight hours for a period of time sufficient to remove and/or prevent buildup of biological or hardness deposits. Likewise, the surface to be protected could rapidly be made anodic several times per second if the contamination aspects of the cooling fluid or medium is appropriate. In any event, however, since the current utilized in the practice of the invention is extremely small, in most cases it would probably be most advantageous to leave the surface to be protected anodic at all times unless economics for a given situation might dictate otherwise.

As stated earlier, one of the main utilities foreseen for the instant invention is the maintenance of heat exchange surfaces free of biological and/or hardness deposits which interfere with the heat transfer characteristics of the exchanger surface. Among the specific uses of the instant invention would be in the maintenance of heat exchange surfaces of coastal power stations or shipboard heat exchangers wherein seawater is utilized as the cooling medium in the exchanger. In such heat exchangers, titanium is often the material of choice for construction of the heat exchangers. Another significant area wherein the instant invention shows significant promise is in the so-called OTEC plants. The so-called Ocean Thermal Energy Conversion plant is one of several options being investigated by the Department of Energy to effectively utilize solar energy. Basically, this concept involves using the temperature difference between the warm surface water of tropical oceans and the deeper, colder water to operate a heat engine. It has been estimated that 4-6% of the anticipated energy needs of the U.S. could be supplied by this concept by the year 2020. Such systems require large heat exchange surfaces, and it appears at this point in time that titanium is the material of choice for constructing these heat exchange systems. Methods which might be used to prevent biofouling of OTEC plants are very limited. The use of chlorine and other biocides is not feasible due to the enormous flow of seawater involved. Also, the environmental effect of such large quantities of chlorine or other biocides in the open ocean would be significant and highly detrimental to the ocean life in the vicinity of such OTEC plants.

Another area of use of the instant invention is in multi-stage flash evaporators used for desalination of water. Multi-stage flash evaporators for desalination of water are currently made of titanium and are indeed in the immediate need of an antifouling technique to prevent buildup of biological and hardness deposits so as to maintain heat transfer characteristics. Fouling of such heat exchange surfaces with magnesium and calcium scale demands the use of high vacuum to reduce the boiling point temperatures resulting in high capital costs to minimize hardness deposits. In most cases acid is actually continuously added to seawater feed to lower the pH to 5. Even with these precautions, the formation of hardness scale dictates frequent shutdowns for acid and mechanical cleaning resulting in high maintenance costs. By the use of the instant invention, the heat exchange surfaces can be maintained clear of deposits and would allow design of equipment to operate at higher temperatures and greater heat transfer efficiency significantly improving capital costs by allowing atmospheric pressure operation.

Still another area of utilizing the instant invention is in the area of geothermal power. Geothermal power plants are subject to extreme conditions of corrosion and fouling. Titanium heat exchangers are used exclusively and are subject to severe hardness scaling. The practice of the instant invention in such cases provides sufficient acidity of the heat exchange surface to prevent hardness deposits thereon.

The following example illustrates the practice of the present invention and also defines the lower limit of effective protection when using seawater as found in the Fort Lauderdale, Florida, area (i.e., seawater containing salt and other dissolved solids such that the voltage at which chlorine is given off is about 1.136 volts versus SCE).

EXAMPLE

A series of 10 centimeter square titanium test panels were coated with a stable anodic coating in the following manner. A master coating solution was prepared as follows:

| | |
|---|---|
| $RuCl_3 \cdot 2.5H_2O$ (38.6% Ru) | 1.192 gm. |
| $SnCl_2$ (anhydrous) | 574 gm. |
| Butyl titanate (14.3% Ti) | 5.580 ml. |
| HCl (35%) | 760 ml. |
| Butanol | 11.220 ml. |

The solution was prepared by partially dissolving the tin and ruthenium salts in the HCl and adding the butanol. After stirring until the salts dissolve, the butyl titanate was added and the solution was again stirred to ensure complete intermixing. Analysis of the solution gives the following composition in grams per liter: Ru 25.5, Ti 44.3 and Sn 20. This represented a $TiO_2$:$(RuO_2+SnO_2)$ mole ratio of 2.2:1 and 40.0 mole percent of $SnO_2$ in $(RuO_2+SnO_2)$.

A portion of this master solution was applied to the titanium panels and the thus-coated titanium was heated in air to a temperature of 450° C. for 7 minutes. This procedure was repeated 10 more times to result in a final coating weight of 1.5 grams per square foot of anode surface on a $(RuO_2+SnO_2)$ basis.

Anodes prepared according to the foregoing were then installed at a seawater intake off Fort Lauderdale, Florida, below the water surface. Six such coated test panels were placed below the water surface and five were made anodic utilizing different current densities on each of five panels. The sixth panel was not made anodic and functioned merely as a control. After five months on-line, the results were as given in the following Table.

TABLE

| Panel Number | $A/m^2$ | Millimoles Oxygen per square meter hour evolved | Surface Fouling |
|---|---|---|---|
| 1 | 10 | 93.2 | None |
| 2 | 3 | 27.96 | None |
| 3 | 1 | 9.32 | Slight edge growth only |
| 4 | 0.3 | 2.80 | Small amount |
| 5 | 0.1 | 0.93 | Completely covered |
| Control | 0 | 0 | Completely covered |

While the invention has been described with reference to certain preferred embodiments thereof, it is not to be so limited as is clear from the specification and appended claims.

What is claimed is:

1. A method of maintaining an electrocatalytic electroconductive surface free of deposits in an aqueous environment containing chloride ion selected from the group consisting of biological and hardness deposits in an aqueous environment, said electrocatalytic, electroconductive surface being such as to be capable of generating an effective amount of oxygen to maintain said surface free of biological and hardness deposits with substantially no evolution of chlorine gas when made anodic, comprising: making said surface anodic so as to electrolyze the water in contact therewith to produce sufficient oxygen and hydrogen ion at said anodic surface to prevent formation of biological or hardness deposits without the evolution of any chlorine.

2. A method of maintaining an electrocatalytic electroconductive surface free of deposits selected from the group consisting of biological and hardness deposits in sodium chloride containing aqueous environment, said electrocatalytic, electroconductive surface being such as to be capable of generating an effective amount of oxygen to maintain said surface free of biological and hardness deposits with substantially no evolution of chlorine gas when made anodic, comprising: making said surface anodic so as to electrolyze the water in contact therewith to produce sufficient oxygen and hydrogen ion at said anodic surface to prevent formation of biological or hardness deposits, said electrolysis taking place at an applied voltage below the threshold voltage at which chlorine is evolved.

3. A method of maintaining a valve metal surface free of deposits selected from the group consisting of biological and hardness deposits in an aqueous environment containing chloride ion comprising: applying to the surface of said valve metal a stable electrocatalytic coating, said coating being such as to be capable of generating an effective amount of oxygen to maintain said surface free of biological and hardness deposits with substantially no evolution of chlorine gas when made anodic, and thereafter, when said coated valve metal surface is in said aqueous environment containing chloride ion, rendering said coated valve metal surface anodic and passing sufficient current therethrough to generate said effective amount of oxygen per square meter of coated valve metal surface area per hour with substantially no chlorine gas being generated.

4. A method of maintaining a valve metal heat exchange surface free of heat exchange interfering deposits in an aqueous environment containing chloride ion comprising: applying to said heat exchange a surface stable electrocatalytic coating, said coating being such as to be capable of generating sufficient oxygen per square meter of coating surface area per hour through the electrolysis of water with evolution of substantially no chlorine gas to maintain said surface free of biological and hardness deposits; and thereafter, when said coated heat exchange surface is in said aqueous environment, rendering said coated heat exchange surface anodic and passing sufficient current therethrough to generate an effective amount of oxygen per square meter of coated heat exchange surface area per hour while generating substantially no chlorine gas.

5. A method of maintaining a valve metal heat exchange surface free of heat exchange interfering deposits of biological origin and hardness scale when in contact with saltwater containing chloride ion comprising: applying to said valve metal heat exchange surface a stable electrocatalytic coating, said coating being such as to be capable anodically of generating sufficient oxygen per square meter of coating surface area per hour through the electrolysis of water with evolution of substantially no chlorine gas to maintain said surface substantially free from biological and hardness deposits; and thereafter, when said coated valve metal heat exchange surface is in contact with saltwater, rendering said coated valve metal heat exchange surface anodic and passing sufficient current therethrough to generate an effective amount of oxygen per square meter of coated valve metal heat exchange surface area per hour while generating substantially no chlorine gas.

6. A method as claimed in any of claims 3, 4 or 5 wherein said coating on said valve metal is selected from the group consisting of iridium, ruthenium, rhodium, delta manganese dioxide, noble metal alloy containing iridium, ruthenium or rhodium, and mixtures containing at least one noble metal oxide and at least one valve metal oxide.

7. A method as stated in any of the claims 3, 4, or 5 wherein the valve metal is titanium.

8. A method as stated in claim 5 wherein the oxygen generated is at least 4.66 millimoles per square meter of surface to be protected per hour.

9. A method as stated in claim 5 wherein the oxygen generated is at least 10.0 millimoles per square meter of surface to be protected per hour.

* * * * *